United States Patent
Oka et al.

(10) Patent No.: US 11,493,762 B2
(45) Date of Patent: Nov. 8, 2022

(54) HEAD MOUNTED DISPLAY, HEAD MOUNTED DISPLAY SYSTEM, AND SETTING METHOD FOR HEAD MOUNTED DISPLAY

(71) Applicant: JVCKENWOOD Corporation, Yokohama (JP)

(72) Inventors: Hisashi Oka, Yokohama (JP); Tetsuji Suzuki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 119 days.

(21) Appl. No.: 16/681,875

(22) Filed: Nov. 13, 2019

(65) Prior Publication Data

US 2020/0166757 A1 May 28, 2020

(30) Foreign Application Priority Data

Nov. 26, 2018 (JP) .............................. JP2018-220682

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 2027/013* (2013.01);
(Continued)

(58) Field of Classification Search
CPC .............. G02B 27/0172; G02B 27/283; G02B 2027/013; G02B 2027/0132;
(Continued)

(56) References Cited

U.S. PATENT DOCUMENTS 4,093,347 A * 6/1978 La Russa ............. G02B 5/3083
359/630
2002/0191073 A1 12/2002 Satoh
(Continued)

FOREIGN PATENT DOCUMENTS

JP 2000-249975 9/2000
JP 4618469 1/2011
(Continued)

*Primary Examiner* — Thomas K Pham
*Assistant Examiner* — Henry A Duong
(74) *Attorney, Agent, or Firm* — Amin, Turocy & Watson, LLP

(57) ABSTRACT

There is provided a head mounted display including: an optical system comprising: right-eye and left-eye optical systems that guide a real image light and right-eye and left-eye virtual image lights; and an optical element comprising: first polarization plates disposed at emission sides of the right-eye and left-eye optical systems; wherein the right-eye virtual image light from the right-eye optical system and the left-eye virtual image light from the left-eye optical system are blocked by the first polarization plate at the emission side of the left-eye optical system and by that of the right-eye optical system respectively; and at least one of: first wave plates disposed at the emission sides of the right-eye and left-eye optical systems so that the real image light from the right-eye and left-eye optical systems passes therethrough; and second wave plates disposed at incident sides of the right-eye and left-eye optical systems.

6 Claims, 7 Drawing Sheets

(52) U.S. Cl.
CPC ............... *G02B 2027/0132* (2013.01); *G02B 2027/0178* (2013.01)

(58) Field of Classification Search
CPC .... G02B 2027/0178; G02B 2027/0134; G02B 2027/0136; G02B 2027/012; G02B 27/0101; G02B 2027/0145
USPC ........................................................ 359/633
See application file for complete search history.

(56) References Cited

U.S. PATENT DOCUMENTS

| | | | | |
|---|---|---|---|---|
| 2011/0032477 | A1* | 2/2011 | Ohanesian | G02C 7/081 351/159.58 |
| 2013/0003177 | A1* | 1/2013 | Ko | H04N 13/332 359/464 |
| 2015/0277124 | A1 | 10/2015 | Ide et al. | |
| 2018/0129112 | A1* | 5/2018 | Osterhout | G02B 27/017 |
| 2019/0369402 | A1* | 12/2019 | Woodman | G02B 27/017 |
| 2020/0041795 | A1* | 2/2020 | Yamaguchi | G02B 27/0172 |

FOREIGN PATENT DOCUMENTS

| | | |
|---|---|---|
| JP | 2013-076959 | 4/2013 |
| JP | 2013-122476 | 6/2013 |
| JP | 2014-521120 | 8/2014 |
| JP | 2017-089087 | 5/2017 |
| JP | 6340867 | 6/2018 |

\* cited by examiner

FIG.5

| Type of polarized light | | A | | B | | |
|---|---|---|---|---|---|---|
| Real image light La | Virtual image light Lb | Polarization direction of polarization plate 21 | Wave plate 22 | Wave plate 51 | Polarization direction of polarization plate 52 | |
| Linearly polarized light (vertical or horizontal) | Linearly polarized light (vertical or horizontal) | None or vertical or horizontal | 1/4 | 1/4 | Vertical or horizontal | 1-I |
| | | | 1/2 | None | Oblique | 1-II |
| | Linearly polarized light (oblique) | None or oblique | 1/4 | 1/4 | Oblique | 2-I |
| | Circularly polarized light | None | 1/4 | 1/2 | Oblique | 3-I |
| | | | None | 1/4 | Vertical or horizontal or oblique | 3-II |
| Linearly polarized light (oblique) | Linearly polarized light (vertical or horizontal) | None or vertical or horizontal | 1/2 | None | Vertical or horizontal | 4-I |
| Circularly polarized light | Linearly polarized light (vertical or horizontal) | None or vertical or horizontal | 1/2 | None | Vertical or horizontal | 5-I |

HEAD MOUNTED DISPLAY, HEAD MOUNTED DISPLAY SYSTEM, AND SETTING METHOD FOR HEAD MOUNTED DISPLAY

CROSS-REFERENCE TO RELATED APPLICATION

This application claims priority from Japanese Application No. 2018-220682, filed on Nov. 26, 2018, the contents of which is incorporated by reference herein in its entirety.

FIELD

The present application relates to a head mounted display, a head mounted display system, and a setting method for the head mounted display.

BACKGROUND

As a technology for implementing augmented reality (AR), for example, a head mounted display (HMD) capable of superimposing a virtual image on a real visual field is known (for example, see JP 6340867 B2). In such a head mounted display, for example, displays respectively corresponding to the right eye and the left eye of a user are arranged, and is configured to make the user's right eye and left eye respectively see an image on a right-eye display and a left-eye display.

JP 6340867 B2 describes a head mounted display that displays a virtual image superimposed on a real visual field. However, increasing the size of an image generating device and an optical system such as a half mirror in a head mounted display may result in the right eye seeing image information corresponding to the left-eye display and the left eye seeing image information corresponding to the right-eye display. For this reason, the right eye sees unnecessary left-eye video information noise, and the left eye sees unnecessary right-eye video information. Such a phenomenon that unnecessary image information is seen is sometimes referred to as crosstalk. As a method for reducing the crosstalk, for example, a method using polarization control in an image separation apparatus described in JP 4618469 B2 has been proposed.

However, when a configuration described in JP 4618469 B2 is used, a head mounted display that displays a virtual image on a real visual field in a superimposed manner might provide unbalanced left and right views depending on a polarized light control configuration. For example, an image with polarized light by such as a liquid crystal television in the real visual field might be viewable by the left eye but may be unviewable by the right eye.

SUMMARY

A head mounted display, a head mounted display system, and a setting method for the head mounted display are disclosed.

According to one aspect, there is provided a head mounted display comprising: an optical system comprising: a right-eye optical system configured to guide a real image light for forming a real visual field image and a right-eye virtual image light for forming a right-eye virtual image that is superimposed on the real visual field image; and a left-eye optical system configured to guide the real image light and a left-eye virtual image light for forming a left-eye virtual image that is superimposed on the real visual field image; and an optical element comprising: one first polarization plate disposed in an optical axis of the right-eye optical system at an emission side thereof as an emission side position; and another first polarization plate disposed in an optical axis of the left-eye optical system at an emission side thereof as the emission side position; wherein the right-eye virtual image light emitted from the right-eye optical system is blocked by the another first polarization plate disposed at the emission side position of the left-eye optical system and the left-eye virtual image light emitted from the left-eye optical system is blocked by the first polarization plate disposed at the emission side position of the right-eye optical system; and at least one of: one first wave plate that can be disposed between the right-eye optical system and the one first polarization plate at the emission side position of the right-eye optical system so that the real image light emitted from the right-eye optical system passes through the one first polarization plate disposed at the emission side position of the right-eye optical system; another first wave plate that can be disposed between the left-eye optical system and the another first polarization plate at the emission side position of the left-eye optical system so that the real image light emitted from the left-eye optical system passes through the another first polarization plate disposed at the emission side position of the left-eye optical system; one second wave plate that can be disposed at an incident side position located in an optical path of the right-eye virtual image light travelling toward the right-eye optical system; and another second wave plate that can be disposed at the incident side position located in an optical path of the left-eye virtual image light travelling toward the left-eye optical system.

According to one aspect, there is provided a head mounted display comprising: a real image display configured to emit real image light for forming a real visual field image; a virtual image display comprising: one virtual image display configured to emit a right-eye virtual image light for forming a right-eye virtual image that is superimposed on the real visual field image; and another virtual image display configured to emit a left-eye virtual image light for forming a left-eye virtual image that is superimposed on the real visual field image; an optical system comprising: a right-eye optical system configured to guide a real image light for forming a real visual field image and a right-eye virtual image light for forming a right-eye virtual image that is superimposed on the real visual field image; and a left-eye optical system configured to guide the real image light and a left-eye virtual image light for forming a left-eye virtual image that is superimposed on the real visual field image; and an optical element OE comprising: one first polarization plate disposed in an optical axis of the right-eye optical system at an emission side thereof as an emission side position; and another first polarization plate disposed in an optical axis of the left-eye optical system at an emission side thereof as the emission side position; wherein the right-eye virtual image light emitted from the right-eye optical system is blocked by the another first polarization plate disposed at the emission side position of the left-eye optical system and the left-eye virtual image light emitted from the left-eye optical system is blocked by the first polarization plate disposed at the emission side position of the right-eye optical system; and at least one of: one first wave plate that can be disposed between the right-eye optical system and the one first polarization plate at the emission side position of the right-eye optical system so that the real image light emitted from the right-eye optical system passes through the one first polarization plate disposed at the emission side position of the right-eye optical system; another first wave plate that can be disposed between the left-eye optical system and the another first polarization plate at the emission side position of the left-eye optical system so that the real image light emitted from the left-eye optical system passes through the another first polarization plate disposed at the emission side position of the left-eye optical system; one second wave plate that can be disposed at an incident side position located in an optical path of the right-eye virtual image light travelling toward the right-eye optical system OSR; and another second wave plate that can be disposed at the incident position located in an optical path of the left-eye virtual image light travelling toward the left-eye optical system.

According to one aspect, there is provided a setting method for a head mounted display including an optical system comprising: a right-eye optical system configured to guide a real image light for forming a real visual field image and a right-eye virtual image light for forming a right-eye virtual image that is superimposed on the real visual field image; and a left-eye optical system configured to guide the real image light and a left-eye virtual image light for forming a left-eye virtual image that is superimposed on the real visual field image; the method comprising: setting an optical element comprising: one first polarization plate disposed in an optical axis of the right-eye optical system at an emission side thereof as an emission side position; and another first polarization plate disposed in an optical axis of the left-eye optical system at an emission side thereof as the emission side position; wherein the right-eye virtual image light emitted from the right-eye optical system is blocked by the another first polarization plate disposed at the emission side position of the left-eye optical system and the left-eye virtual image light emitted from the left-eye optical system is blocked by the first polarization plate disposed at the emission side position of the right-eye optical system; and at least one of: one first wave plate that can be disposed between the right-eye optical system and the one first polarization plate at the emission side position of the right-eye optical system so that the real image light emitted from the right-eye optical system passes through the one first polarization plate disposed at the emission side position of the right-eye optical system; another first wave plate that can be disposed between the left-eye optical system and the another first polarization plate at the emission side position of the left-eye optical system so that the real image light emitted from the left-eye optical system passes through the another first polarization plate disposed at the emission side position of the left-eye optical system; one second wave plate that can be disposed at an incident side position located in an optical path of the right-eye virtual image light travelling toward the right-eye optical system; and another second wave plate that can be disposed at the incident side position located in an optical path of the left-eye virtual image light travelling toward the left-eye optical system.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 5 is a table illustrating combinations among types of polarized light of real image light and virtual image light, a polarization plate and a wave plate provided in an incident side attachment/detachment portion, and a wave plate and a polarization plate provided in an emission side attachment/detachment portion;

DETAILED DESCRIPTION OF THE PREFERRED EMBODIMENTS

Hereinafter, embodiments of a head mounted display according to the present application will be described based on the drawings. The present application is not limited by the embodiments. In addition, components in the following embodiments include those that can be easily replaced by persons skilled in the art or those that are substantially the same.

Figure 1:
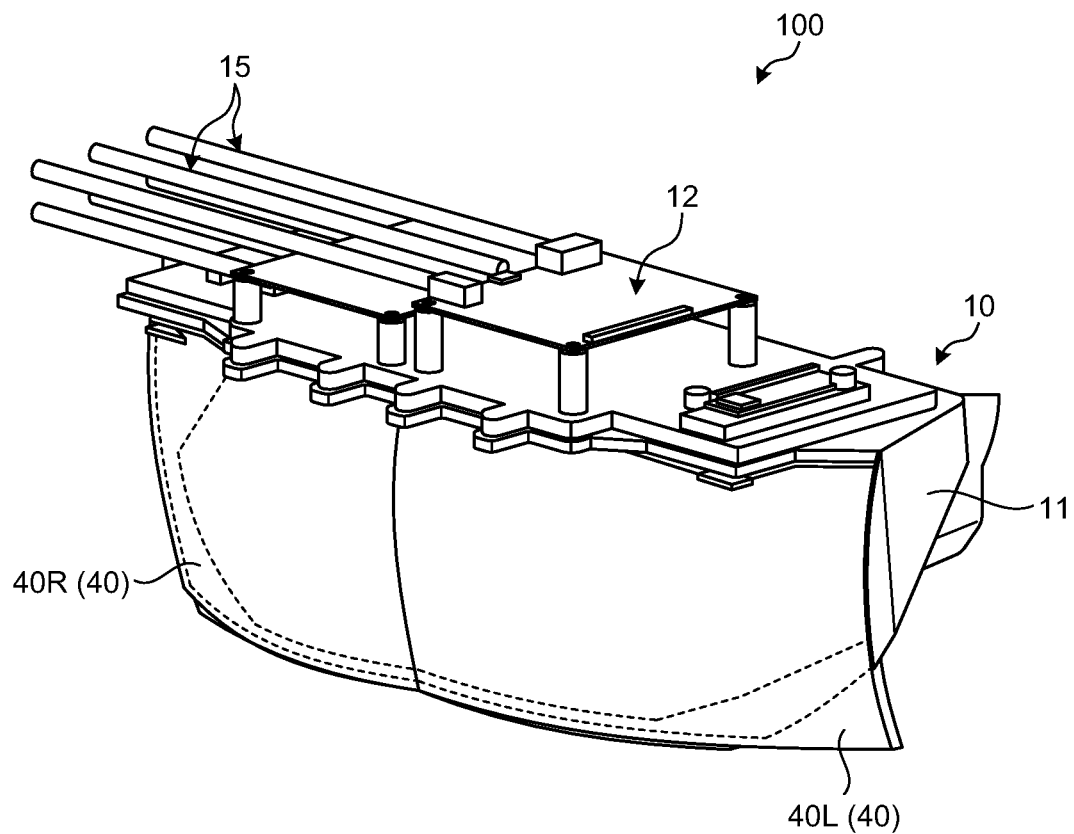
FIG. 1 is a perspective view illustrating an example of a head mounted display according to the present embodiment.

FIG. 1 is a perspective view illustrating an example of a head mounted display 100 according to the present embodiment. The head mounted display 100 illustrated in FIG. 1 can be worn by a user on his or her head. As illustrated in FIG. 1, the head mounted display 100 includes a main body unit 10 and a power supply unit 15. The main body unit 10 includes a casing 11 and a connector 12. The casing 11 accommodates an optical system OS and an optical element OE described later. The power supply unit 15 performs power supply, transmission/reception of an electrical signal, and the like for the main body unit 10 via the connector 12.

Figure 2:
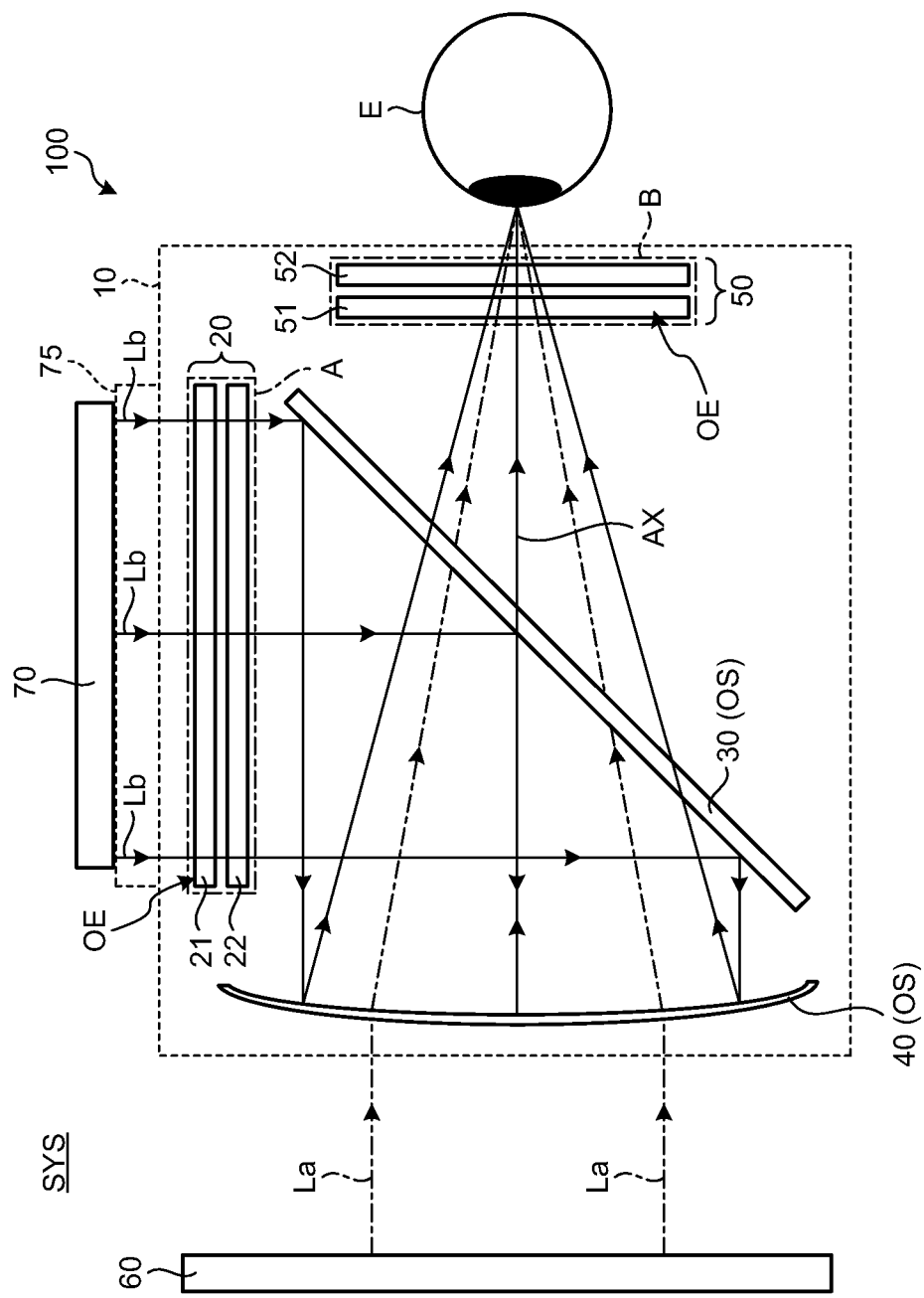
FIG. 2 is a diagram schematically illustrating an internal configuration of the head mounted display.

FIG. 2 is a diagram schematically illustrating an internal configuration of the head mounted display 100. As illustrated in FIG. 2, the head mounted display 100 includes an incident side attachment/detachment portion 20, a folding mirror 30, a combiner mirror 40, and an emission side attachment/detachment portion 50. The head mounted display 100 is configured to show the user a real visual field image and a virtual image superimposed on the real visual field image, in a state of being worn by the user (hereinafter referred to as a worn state). The real visual field image is an image outside of the head mounted display 100, and includes, for example, a display image provided by a real image display 60 disposed outside the head mounted display 100. The virtual image includes a display image provided by a virtual image display 70. Examples of the real image display 60 and the virtual image display 70 may include various displays such as a liquid crystal display, an organic EL display, and a plasma display. Such a real image display 60 and virtual image display 70 may be configured to emit light including polarized light such as linearly polarized light and circularly polarized light, for example. In the present embodiment, the head mounted display 100 has a display attachment/detachment portion 75 for detachably attaching the virtual image display 70 (see FIG. 2). With this configuration, the virtual image display 70 is, for example, detachably attached to the head mounted display 100. The virtual image display 70 may be mounted on the head mounted display 100 in advance.

Figure 3:
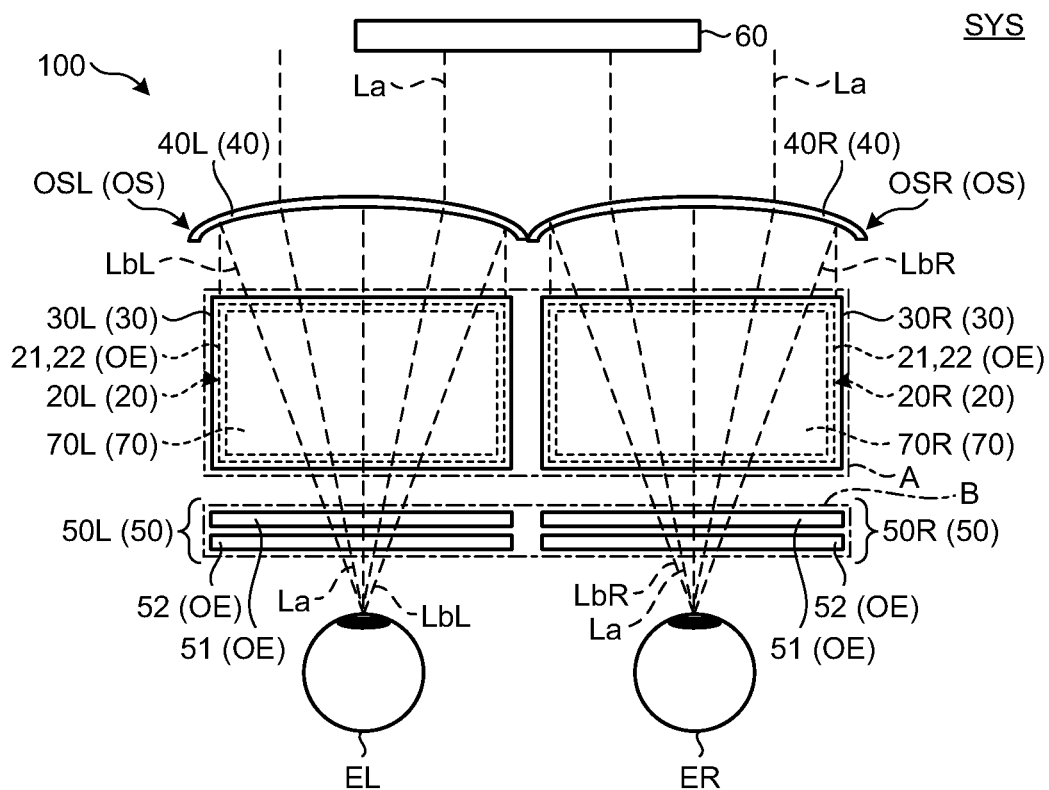
FIG. 3 is a diagram schematically illustrating an example of the head mounted display.

FIG. 3 is a diagram schematically illustrating an example of the head mounted display 100. As illustrated in FIG. 3, in the head mounted display 100, one configuration including the incident side attachment/detachment portion 20, the folding mirror 30, the combiner mirror 40, and the emission side attachment/detachment portion 50, illustrated in FIG. 2, is provided for each of the left and right eyes. Similarly, one virtual image display 70 is provided for each of the left and right eyes. In FIG. 3, the components corresponding to the right eye have a sign "R" provided after their reference numerals illustrated in FIG. 2, whereas the components corresponding to the left eye have a sign "L" provided after their reference numerals illustrated in FIG. 2. In the present embodiment, a head mounted display system SYS includes the head mounted display 100, the real image display 60, and the virtual image display 70 including a right-eye virtual image display 70R and a left-eye image virtual image display 70L.

As illustrated in FIGS. 2 and 3, for example, a half mirror that reflects a part of light and transmits a part of the light is used as the folding mirror 30. The folding mirror 30 reflects a part of virtual image light Lb, emitted from the virtual image display 70 and passed through the incident side attachment/detachment portion 20 described later, toward the combiner mirror 40. A part of the light reflected by the combiner mirror 40 passes through the folding mirror 30.

Real image light La for forming the real visual field image transmits through the combiner mirror 40 to travel toward the folding mirror 30. The real image light La includes light used by the real image display 60 for forming a display image. Furthermore, the combiner mirror 40 reflects the virtual image light Lb reflected by the folding mirror 30 toward the folding mirror 30. The folding mirror 30 and the combiner mirror 40 form the optical system OS for guiding the real image light La and the virtual image light Lb. In the present embodiment, the optical system OS guides the real image light La and the virtual image light Lb to the eye E (right eye ER and left eye EL: see FIG. 3) of the user wearing the head mounted display 100.

Hereinafter, the optical system OS provided for the right eye is referred to as a right-eye optical system OSR, and the optical system OS provided for the left eye is referred to as a left-eye optical system OSL (see FIG. 3). As illustrated in FIG. 3, the right-eye optical system OSR guides the real image light La and right-eye virtual image light LbR emitted from the right eye virtual image display 70R. The left-eye optical system OSL guides the real image light La and the left-eye virtual image light LbL emitted from the left eye virtual image display 70L.

The incident side attachment/detachment portion 20 is disposed at an incident side position A. The incident side position A is a position in an optical path of each of the right-eye virtual image light LbR and the left-eye virtual image light LbL traveling toward the right-eye optical system OSR and the left-eye optical system OSL respectively. The optical element OE including a polarization plate (second polarization plate) 21 and a wave plate (second wave plate) 22 can be attached to and detached from the incident side attachment/detachment portion 20. This enables switching among a state where both of the polarization plate 21 and the wave plate 22 are provided in the incident side attachment/detachment portion 20, a state where one of these is provided in the incident side attachment/detachment portion 20, and a state where neither of these is provided in the incident side attachment/detachment portion 20. The polarization plate 21 and the wave plate 22 may be provided such that their rotational positions around an optical axis AX of the optical system OS can be adjustable. For example, the polarization direction can be changed by adjusting the rotational position of the polarization plate 21 around the optical axis AX. For example, the polarization plate 21 may not be provided when the virtual image display 70 is provided with a polarization element such as a polarization film. The virtual image light Lb for forming the virtual image displayed on the virtual image display 70 is incident on the incident side attachment/detachment portion 20.

The emission side attachment/detachment portion 50 is disposed at an emission side position B. The emission side position B is a position in the optical axis AX of each of the right-eye optical system OSR and the left-eye optical system OSL on the emission side. The optical element OE including a wave plate (first wave plate) 51 and a polarization plate (first polarization plate) 52 can be attached to and detached from the emission side attachment/detachment portion 50. This enables switching among a state where both of the wave plate 51 and the polarization plate 52 are provided in the emission side attachment/detachment portion 50, a state where one of these is provided in the emission side attachment/detachment portion 50, and a state where neither of these is provided in the emission side attachment/detachment portion 50. Note that the polarization plate 52 may be configured to be constantly provided in the emission side attachment/detachment portion 50. The wave plate 51 and the polarization plate 52 may be provided such that their rotational positions around the optical axis AX of the optical system OS can be adjustable. For example, the polarization direction can be changed by adjusting the rotational position of the polarization plate 52 around the optical axis AX. The real image light La and the virtual image light Lb transmitted through the folding mirror 30 are incident on the emission side attachment/detachment portion 50.

Figure 4:
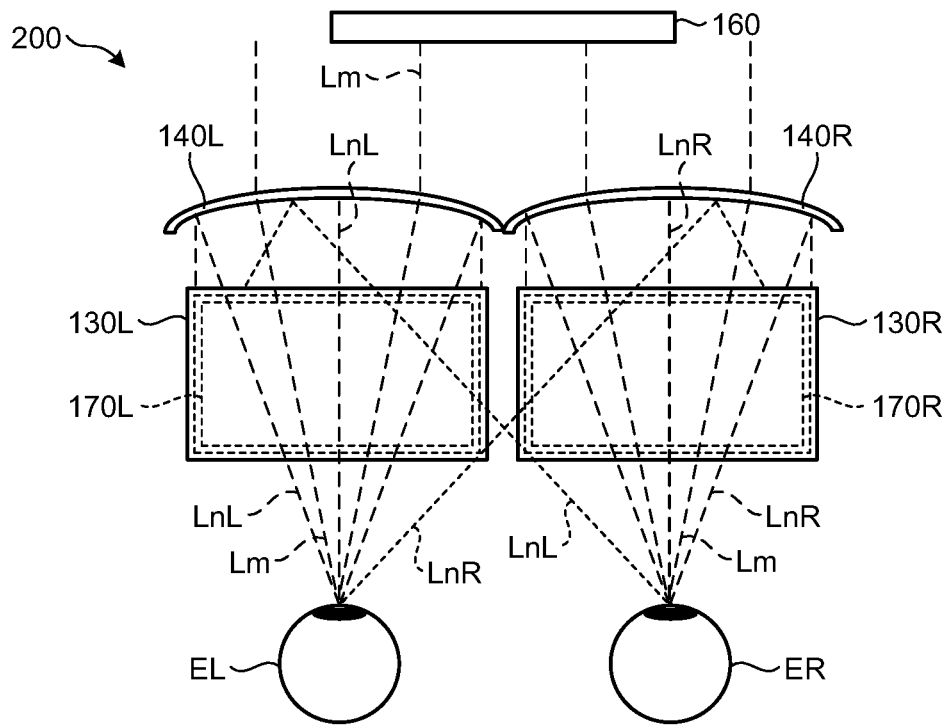
FIG. 4 is a diagram illustrating an example of a head mounted display according to a comparative example.

FIG. 4 is a diagram illustrating an example of a head mounted display 200 according to a comparative example. In the head mounted display 200 illustrated in FIG. 4, virtual image light LnR emitted from a right-eye display 170R may reach the left eye via a folding mirror 130R and a combiner mirror 140R, and virtual image light LnL emitted from a left-eye display 170L may reach the right eye via a folding mirror 130L and a combiner mirror 140L. In this case, a virtual image displayed on the right-eye display 170R might be viewed by the left eye EL, and/or a virtual image displayed on the left-eye display 170L might be viewed by the right eye ER. Such a phenomenon is referred to as crosstalk in some cases. Unfortunately, an attempt to reduce the crosstalk might result in unbalanced left and right views. Specifically, a real image (real image light Lm) displayed on a liquid crystal television 160 and the like in the real visual field might be viewable with the left eye EL but unviewable with the right eye ER, for example. In order to reduce the crosstalk, it is required to suppress the unbalanced left and right views of the real image displayed on the liquid crystal television 160 and the like in the real visual field for example.

FIG. 5 is a table illustrating combinations among types of polarized light of the real image light La and the virtual image light Lb, the polarization plate 21 and the wave plate 22 provided in the incident side attachment/detachment portion 20, and the wave plate 51 and the polarization plate 52 provided in the emission side attachment/detachment portion 50.

The real image light La and the virtual image light Lb may include polarized light, such as linearly polarized light and circularly polarized light for example. Hereinafter, the linearly polarized light is assumed to be light vibrating in a constant vibration direction. The linearly polarized light may be referred to as linearly polarized light (vertical), linearly polarized light (horizontal), linearly polarized light (oblique), or the like depending on its direction. The linearly polarized light (vertical) is, as an example, light vibrating in a direction orthogonal to the horizontal plane, in the real image light La. In addition, with regard to the virtual image light Lb, light that vibrates in a direction orthogonal to the horizontal plane in a state of being superimposed on the real image light La is assumed to be linearly polarized light (vertical). Furthermore, the linearly polarized light (horizontal) is assumed to be light vibrating in a direction orthogonal to the vibration direction of the linearly polarized light (vertical).

In addition, linearly polarized light (oblique) is assumed to be light whose vibration direction is inclined with respect to the linearly polarized light (vertical) and the linear polarized light (horizontal). Further, the linearly polarized light (oblique) includes, for example, linearly polarized light (+45 degrees oblique) that is linearly polarized light with the polarization direction inclined clockwise by 45 degrees relative to the linearly polarized light (vertical) as viewed in the traveling direction of light, and linearly polarized light (−45 degrees oblique) that is linearly polarized light with the polarization direction inclined counterclockwise by 45 degrees relative to the linearly polarized light (vertical) as viewed in the traveling direction of light. In addition, the circularly polarized light is assumed to be light traveling with the vibration direction rotating right or left around the traveling direction of light. Note that the above criteria for the linearly polarized light (vertical), linearly polarized light (horizontal), and linearly polarized light (oblique) are merely examples, and the present application is not limited thereto.

The virtual image light Lb and the real image light La are defined as follows according to their positions. Light at a position just after being emitted from the virtual image display 70 is defined as virtual image light Lb1 in the virtual image light Lb. Light at a position just after transmitting through the wave plate 22 is defined as virtual image light Lb2 in the virtual image light Lb. Light at a position just before being incident on the wave plate 51 is defined as virtual image light Lb3 in the virtual image light Lb. Light at a position just before being incident on the polarization plate 52 is defined as virtual image light Lb4 in the virtual image light Lb. light at a position just after transmitting through the polarization plate 52 is defined as virtual image light Lb5 in the virtual image light Lb. In addition, "R" is added to the end of the reference numeral of each of the virtual image light beams Lb1 to Lb5 corresponding to the right eye, and thus is described as right-eye virtual image light beams Lb1R to Lb5R. Furthermore, "L" is added to the end of the reference numeral of each of the virtual image light beams Lb1 to Lb5 corresponding to the left eye, and thus is described as left-eye virtual image light beams Lb1L to Lb5L.

Light at a position just after being emitted from the real image display 60 is defined as real image light La1 in the real image light La. Light at a position just before being incident on the wave plate 51 is defined as real image light La2 in the real image light La. Light at a position just before being incident on the polarization plate 52 is defined as real image light La3 in the real image light La. Light at a position just after passing through the polarization plate 52 is defined as real image light La4 in the real image light La. In addition, "R" is added to the end of the reference numeral of the real image light La corresponding to the right eye, and "L" is added to the end of the reference numeral of the virtual image light La corresponding to the left eye, only when there is a difference in polarized light between the right-eye real image light La and the left-eye real image light La.

In the description given later with reference to FIGS. 6A and 6B, FIGS. 7A and 7B, and FIGS. 8A and 8B, an XYZ three-dimensional orthogonal coordinate system will be used as appropriate. The front-rear direction (depth direction), the left-right direction (horizontal direction), and the vertical direction (vertical direction) from the user are respectively defined as Z, X, and Y directions. The front direction is +Z direction, the back direction is −Z direction, the right direction is +X direction, the left direction is −X direction, the upper direction is +Y direction, and the lower direction is −Y direction.

(1) Case Where the Real Image Light La and the Virtual Image Light Lb Include Linearly Polarized Light (Vertical) or Linearly Polarized Light (Horizontal)

In this case, the polarization plate 21 disposed at the incident side position A can be a polarization plate having a polarization direction in a direction in which the virtual image light Lb1 can be transmitted. When the virtual image light Lb1 has linearly polarized light beams (vertical) or linearly polarized light beams (horizontal) in the same direction, the polarization plate 21 may not be provided. In this case, the optical loss in the polarization plate 21 needs not to be taken into consideration since the polarization plate 21 is not provided, and thus light can be efficiently used. When the virtual image light Lb1 is neither linearly polarized light (vertical) nor linearly polarized light (horizontal), for example, a polarization plate 21L and a polarization plate 21R are arranged to make both polarization directions of the left-eye virtual image light Lb1L and the right-eye virtual image light Lb1R correspond to the linearly polarized light (vertical). The wave plate 22 disposed at the incident side position A may be a quarter wave plate or a half wave plate.

As illustrated in (1-I) of FIG. 5, when a quarter wave plate is disposed at the incident side position A, the linearly polarized light (vertical) or the linearly polarized light (horizontal) of the virtual image light Lb1 is converted into virtual image light Lb2 which is circularly polarized light. In this case, the quarter wave plate is selected in such a manner that a wave plate 22R disposed at the incident side position A of the right eye side and a wave plate 22L disposed at the incident side position A of the left eye side are opposite to each other in the rotation direction of the circularly polarized light.

Figure 6A:
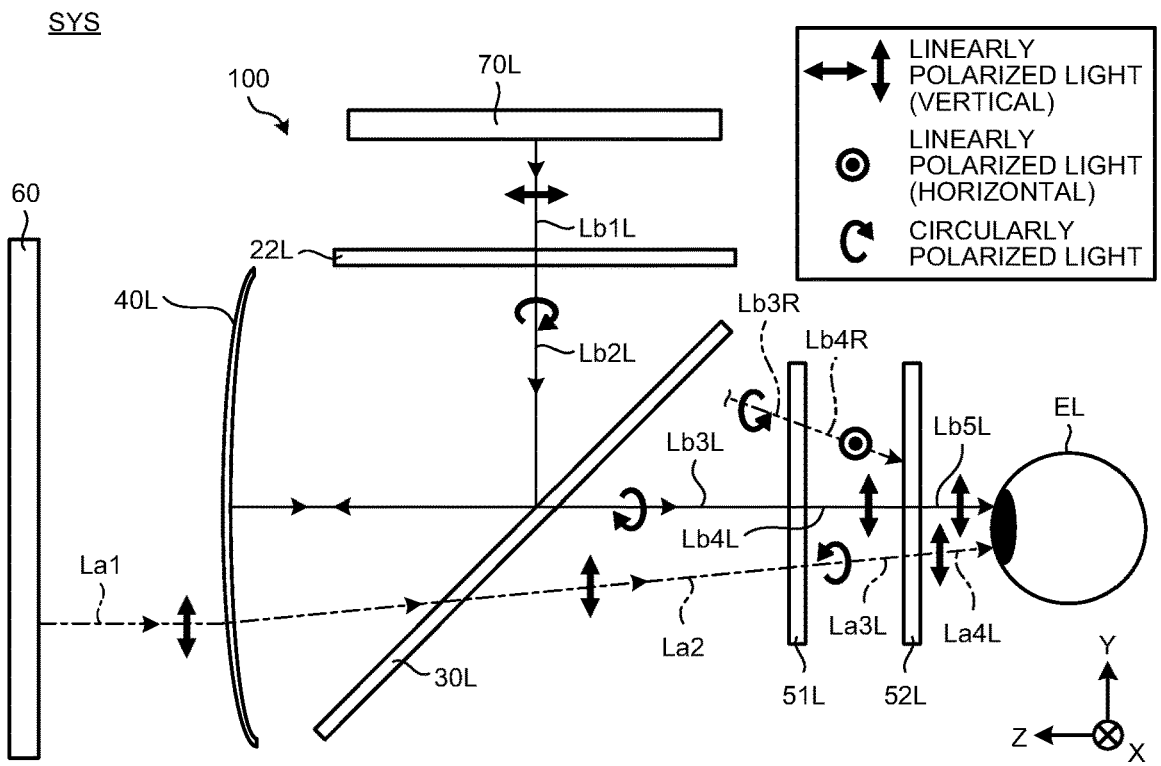
FIG. 6A is a left-eye side view illustrating an example of a combination in the table of FIG. 5.
Figure 6B:
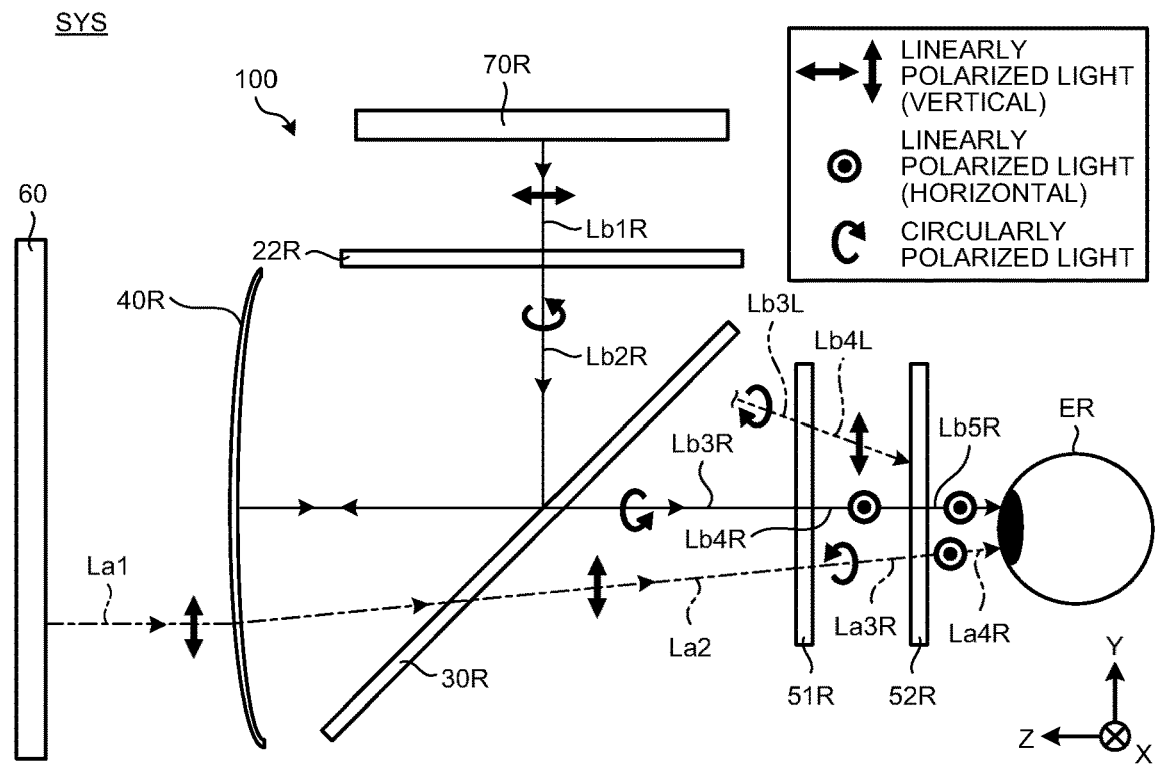
FIG. 6B is a right-eye side view illustrating an example of a combination in the table of FIG. 5.

FIGS. 6A and 6B schematically illustrate an example (example 1-I) of a combination in the table illustrated in FIG. 5. FIG. 6A illustrates the left eye side, and FIG. 6B illustrates the right eye side. For example, the wave plate 22L is a quarter wave plate having an optical axis. The optical axis of the wave plate 22L is disposed while being inclined by a predetermined angle with respect to the Z axis that is the same as the polarization direction of the left-eye virtual image light Lb1L. The predetermined angle by which the optical axis of the wave plate 22L is inclined is 45 degrees in the counterclockwise direction as viewed in a traveling direction (−Y direction) of the virtual image light Lb1. The wave plate 22R is a quarter wave plate having an optical axis. The optical axis of the wave plate 22R is disposed while being inclined by a predetermined angle with respect to the Z axis that is the same as the polarization direction of the right-eye virtual image light Lb1R. The predetermined angle by which the optical axis of the wave plate 22R is inclined is 45 degrees in the clockwise direction as viewed in the traveling direction (−Y direction) of the virtual image light Lb1. With this configuration, as illustrated in FIG. 6A, when the left-eye virtual image light Lb1L, which is linearly polarized light (vertical), passes through the wave plate 22L, it becomes, for example, right-circularly-polarized left-eye virtual image light Lb2L, and as illustrated in FIG. 6B, the right-eye virtual image light Lb1R, which is linearly polarized light (vertical), becomes left circularly polarized right-eye virtual image light Lb2R, which is opposite to the left-eye virtual image light Lb2L.

In the case illustrated in (1-I) of FIG. 5, as the wave plate 51 disposed at the emission side position B, a quarter wave plate is selected. With this quarter wave plate, the circularly polarized virtual image light Lb3 is converted into linearly polarized virtual image light Lb4 when transmitted through the folding mirror 30. In this case, at the emission side position B, a quarter wave plate with the same optical rotation is selected for each of a wave plate 51R disposed at the right eye side and a wave plate 51L disposed at the left eye side. For example, both the wave plate 51L and the wave plate 51R are quarter wave plates having an optical axis. Since the virtual image light Lb1 is linearly polarized light (vertical), the virtual image light Lb3 is linearly polarized light (vertical) in the Y direction when the wave plate 22 is not disposed. Therefore, the optical axes of the wave plates 51L and 51R are arranged to be inclined by a predetermined angle with respect to the Y axis. The predetermined angle by which the optical axes of the wave plates 51L and 51R are inclined is 45 degrees in the clockwise direction as viewed in the traveling direction (−Z direction) of the virtual image light Lb3. With this configuration, as illustrated in FIG. 6A, when the left-eye virtual image light Lb3L, which is right-circularly-polarized light, passes through the wave plate 51L, it becomes left eye virtual image light Lb4L which is linearly polarized light (vertical), and as illustrated in FIG. 6B, when the right eye virtual image light Lb3R, which is left-circularly-polarized light, passes through the wave plate 51R, it becomes right-eye virtual image light Lb4R which is linearly polarized light (horizontal) orthogonal to the left eye virtual image light Lb4L.

Thus, the circularly polarized light emitted from the wave plate 22 disposed at the incident side position A changes its direction of rotation when it is reflected by the folding mirror 30 and the combiner mirror 40, and thereby its rotation direction when reaching the emission side position B becomes the same as that when being emitted from the wave plate 22. Therefore, one of the right-eye virtual image light Lb3R and the left-eye virtual image light Lb3L is right-circularly polarized, and the other one is left-circularly polarized. For example, as illustrated in FIG. 6A, the left-eye virtual image light Lb3L is left-circularly-polarized light, and as illustrated in FIG. 6B, right-eye virtual image light Lb3R is right-circularly-polarized light. In this state, by entering the wave plates 51R and 51L with the same optical rotation, one of the right-eye virtual image light Lb3R and the left-eye virtual image light Lb3L is converted into linearly polarized (vertical) and the other is converted into linearly polarized light (horizontal) by the wave plates 51R and 51L. For example, as illustrated in FIG. 6A, the left-eye virtual image light Lb4L becomes linearly polarized light (vertical). As illustrated in FIG. 6B, the right-eye virtual image light Lb4R becomes linearly polarized light (horizontal).

As the polarization plate 52 disposed at the emission side position B, a linear polarization plate through which the virtual image light Lb4 of the linearly polarized light (vertical) or the linearly polarized light (horizontal) as a result of the conversion by the wave plate 51 can pass is selected. In this case, the polarization direction of light passing through the polarization plate 52R disposed at the emission side position B on the right eye side and the polarization direction of light passing through the polarization plate 52L disposed at the emission side position B on the left eye side are shifted from each other by 90 degrees. For example, as illustrated in FIG. 6A, the left-eye polarization plate 52L is arranged to enable the left-eye virtual image light Lb4L of the linearly polarized light (vertical) to pass therethrough. As illustrated in FIG. 6B, the right-eye polarization plate 52R is arranged to enable the right-eye virtual image light Lb4R of the linearly polarized light (horizontal) to pass therethrough.

Therefore, for example, when the right-eye virtual image light Lb3R transmitted through the folding mirror 30 reaches the emission side position B on the left eye side, it is converted into linearly polarized right-eye virtual image light Lb4R by the wave plate 51L. However, the right-eye virtual image light Lb4R is polarized light polarized in a direction shifted by 90 degrees with respect to the polarization direction of the polarization plate 52L, and thus is blocked by the polarization plate 52L. That is, as illustrated in FIG. 6A, the right-eye virtual image light Lb3R is converted into the right-eye virtual image light Lb4R which is linearly polarized light (horizontal) by the wave plate 51L, but the right-eye virtual image light Lb4R is blocked by the polarization plate 52L through which the linearly polarized light (vertical) can pass. Similarly, when the left-eye virtual image light Lb3L transmitted through the folding mirror 30 reaches the emission side position B on the right eye side, it is converted into linearly polarized left-eye virtual image light Lb4L by the wave plate 51R. However, the left-eye virtual image light Lb4L is polarized light polarized in a direction shifted by 90 degrees with respect to the polarization direction of the polarization plate 52R, and thus is blocked by the polarization plate 52R. That is, as illustrated in FIG. 6B, the left-eye virtual image light Lb3L is converted into the left-eye virtual image light Lb4L of linearly polarized light (vertical) by the wave plate 51R. However, the left-eye virtual image light Lb4L is blocked by the polarization plate 52R through which linearly polarized light (horizontal) can pass.

Furthermore, the real image light La1 which is linearly polarized light (vertical) or linearly polarized light (horizontal) passes through the combiner mirror 40 and the folding mirror 30 to become real image light La2 while still being linearly polarized light. The real image light La2 is incident on the left and right wave plates 51R and 51L respectively, and is converted into the circularly polarized real image light La3 by the left and right wave plates 51R and 51L to be incident on the polarization plates 52R and 52L respectively. That is, as illustrated in FIGS. 6A and 6B, the real image light La2, which is, for example, linearly polarized light (vertical), transmits through the wave plate 51R and the wave plate 51L to be the real image light La3 that is circularly polarized light. In this case, in the left and right real image light La, only a component with the polarization directions of the polarization plates 52R and 52L pass through the polarization plates 52R and 52L to be the real image light La4.

Specifically, as illustrated in FIG. 6A, the linearly polarized (vertical) component of the circularly polarized real image light La3L passes through the polarization plate 52L through which linearly polarized light (vertical) can pass, to be left-eye real image light La4L. Furthermore, as illustrated in FIG. 6B, the linearly polarized (horizontal) component of the circularly polarized real image light La3R passes through the polarization plate 52R through which linearly polarized light (horizontal) can pass, to be right-eye real image light La4R. When the real image light La3 is circularly polarized light not including elliptically polarized light, an amount of the component of linearly polarized light (vertical) is the same as an amount of the component of linearly polarized light (horizontal) in the real image light La3. Therefore, the right-eye real image light La4R and the left-eye real image light La4L have the same brightness, and the real image light La can be uniformly viewed by the left eye EL and the right eye ER.

On the other hand, as illustrated in (1-II) of FIG. 5, when a half wave plate is disposed at the incident side position A, the linearly polarized light (vertical) or the linearly polarized light (horizontal) of the virtual image light is converted into linearly polarized light (oblique). In this case, the half wave plate is selected in such a manner that the wave plate 22R disposed at the incident side position A of the right eye side and the wave plate 22L disposed at the incident side position A of the left eye side have polarization directions shifted from each other by 90 degrees.

Figure 7A:
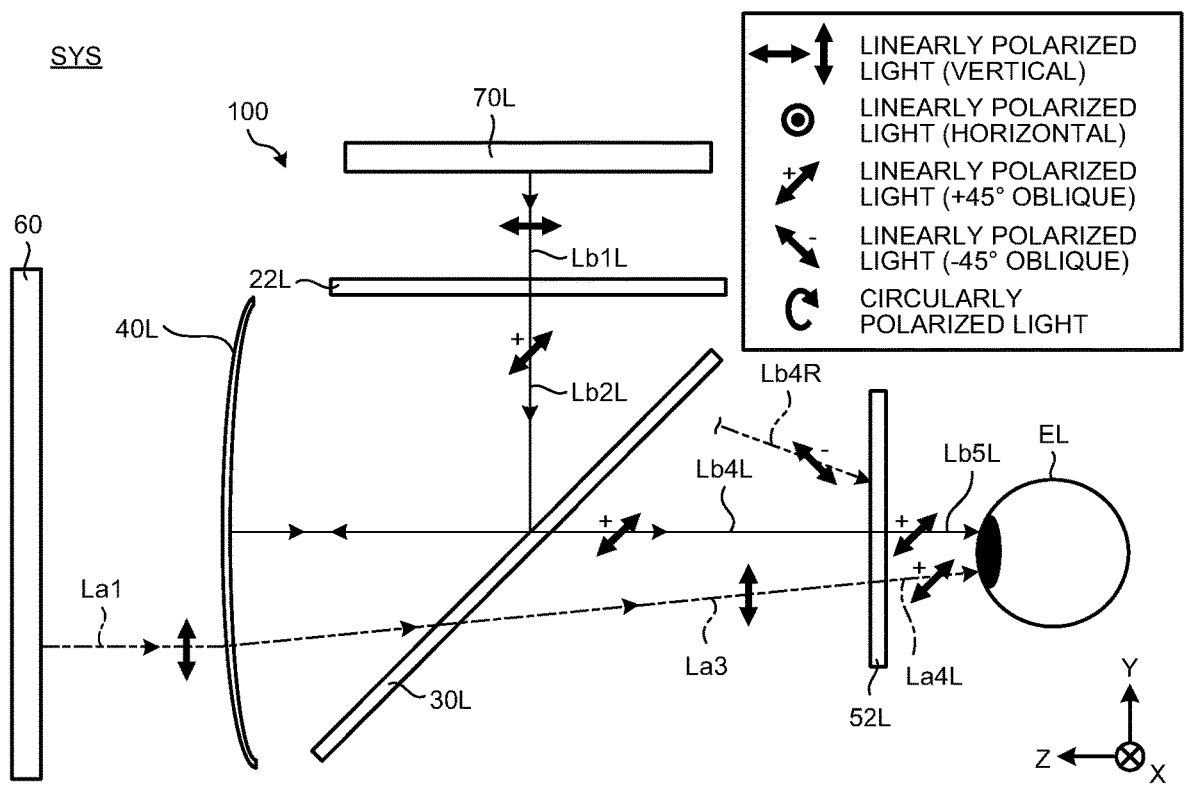
FIG. 7A is a left-eye side view illustrating an example of a combination in the table of FIG. 5.
Figure 7B:
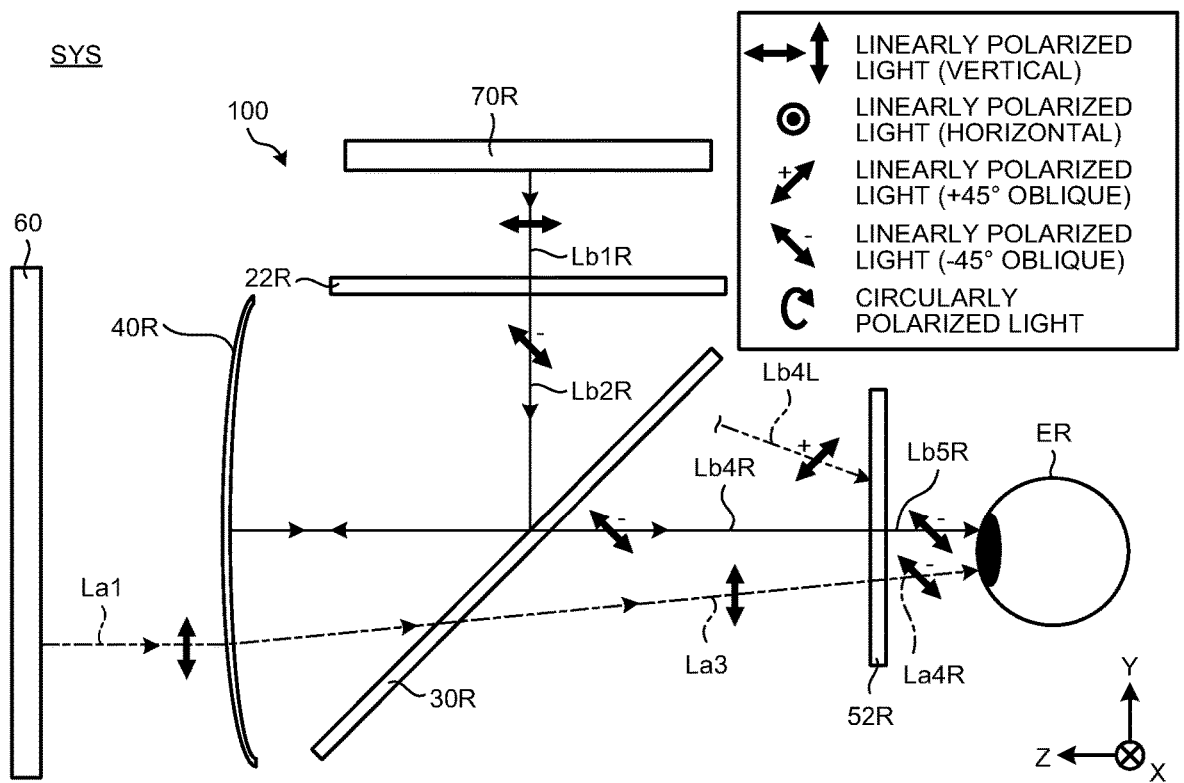
FIG. 7B is a right-eye side view illustrating an example of a combination in the table of FIG. 5.

FIGS. 7A and 7B schematically illustrate an example (example 1-II) of a combination in the table illustrated in FIG. 5. FIG. 7A illustrates the left eye side, and FIG. 7B illustrates the right eye side. For example, the wave plate 22L is a half wave plate having an optical axis. The optical axis of the wave plate 22L is disposed while being inclined by a predetermined angle with respect to the Z axis that is the same direction as the polarization direction of the left-eye virtual image light Lb1L. The predetermined angle by which the optical axis of the wave plate 22L is inclined is 22.5 degrees in the clockwise direction as viewed in the traveling direction (−Y direction) of the virtual image light Lb1. The wave plate 22R is a half wave plate having an optical axis. The optical axis of the wave plate 22R is disposed while being inclined by a predetermined angle with respect to the Z axis that is the same direction as the polarization direction of the right-eye virtual image light Lb1R. The predetermined angle by which the optical axis of the wave plate 22R is inclined is 22.5 degrees in the counterclockwise direction as viewed in the traveling direction (−Y direction) of the virtual image light Lb1. With this configuration, as illustrated in FIG. 7A, the left-eye virtual image light Lb1L, which is linearly polarized light (vertical), turns into the left-eye virtual image light Lb2L which is linearly polarized light (+45 degrees oblique) through the wave plate 22L. As illustrated in FIG. 7B, the right-eye virtual image light Lb1R, which is linearly polarized light (vertical), turns into the right-eye virtual image light Lb2R which is linearly polarized light (−45 degrees oblique) through the wave plate 22R.

In the case illustrated in (1-II) of FIG. 5, the wave plate 51 is not disposed at the emission side position B. As the polarization plate 52 disposed at the emission side position B, a polarization plate through which the virtual image light Lb4 of the linearly polarized light (oblique) as a result of the conversion by the wave plate 22 can pass is selected. In this case, the polarization direction of the polarization plate 52R disposed at the emission side position B on the right eye side differs by 90 degrees from the polarization direction of the polarization plate 52L disposed at the emission side position B on the left eye side. For example, as illustrated in FIG. 7A, the polarization plate 52L is disposed so that linearly polarized light with +45 degrees oblique can pass therethrough. As illustrated in FIG. 7B, the polarization plate 52R is disposed so that linearly polarized light with −45 degrees oblique can pass therethrough.

Therefore, for example, when the right-eye virtual image light Lb4R transmitted through the folding mirror 30 reaches the emission side position B on the left eye side, it is blocked by the polarization plate 52L since the polarization direction of the right-eye virtual image light Lb4R is shifted by 90 degrees from the polarization direction of the polarization plate 52L. Thus, as illustrated in FIG. 7A, the right-eye virtual image light Lb4R, which is linearly polarized light (−45 degrees oblique), is blocked by the polarization plate 52L through which linearly polarized light with +45 degrees oblique can pass. Similarly, when the left-eye virtual image light Lb4L transmitted through the folding mirror 30 reaches the emission side position B on the right eye side, it is blocked by the polarization plate 52R since the polarization direction of the left-eye virtual image light Lb4L is shifted by 90 degrees from the polarization direction of the polarization plate 52R. Thus, as illustrated in FIG. 7B, the left-eye virtual image light Lb4L, which is linearly polarized light (+45 degrees oblique), is blocked by the polarization plate 52R through which linearly polarized light with −45 degrees oblique can pass.

Furthermore, the real image light La1 which is linearly polarized light (vertical) or linearly polarized light (horizontal) is transmitted through the combiner mirror 40 and the folding mirror 30 to become real image light La3 while still being linearly polarized light. The real image light La3 is incident on the polarization plate 52. Therefore, some components of each of the left and right real image light beams La3 pass through the polarization plates 52R and 52L, respectively, to become the real image light La4. Specifically, as illustrated in FIG. 7A, a +45 degrees oblique component of the real image light La3 that is linearly polarized light (vertical) is transmitted through the polarization plate 52L to be the left-eye real image light La4L. Furthermore, as illustrated in FIG. 7B, a −45 degrees oblique component of the real image light La3 that is linearly polarized light (vertical) is transmitted through the polarization plate 52R to be the right-eye real image light La4R. Here, an amount of the +45 degree oblique component and an amount of the 45 degree oblique component of the real image light La3 are the same. Therefore, the right-eye real image light La4R and the left-eye real image light La4L have the same brightness, and the real image light La can be uniformly viewed by the left eye EL and the right eye ER.

Thus, the right-eye virtual image light LbR emitted from the right-eye optical system OSR is blocked by the polarization plate 52L on the emission side of the left-eye optical system OSL. Furthermore, the left-eye virtual image light LbL emitted from the left-eye optical system OSL is blocked by the polarization plate 52R on the emission side of the right-eye optical system OSR. Then, in the real image light La emitted from the right-eye optical system OSR and the left-eye optical system OSL, the component with the same amount passes through the polarization plates 52R and 52L respectively.

(2) Case Where the Real Image Light La Includes Linearly Polarized Light (Vertical) or Linearly Polarized Light (Horizontal) and the Virtual Image Light Lb Include Linearly Polarized Light (Oblique)

In this case, the polarization plate 21 disposed at the incident side position A can be a polarization plate having a polarization direction in a direction in which the virtual image light Lb1 can be transmitted. The left-eye virtual image light Lb1L and the right-eye virtual image light Lb1R are assumed to be linearly polarized light beams (oblique) in the same direction. Also in this case, the polarization plate 21 may not be provided. In this case, the optical loss in the polarization plate 21 needs not to be taken into consideration since the polarization plate 21 is not provided, and thus light can be efficiently used. Further, as the wave plate 22 disposed at the incident side position A, for example, a quarter wave plate may be selected.

As illustrated in (2-I) of FIG. 5, when a quarter wave plate is disposed at the incident side position A, the virtual image light Lb1 which is linearly polarized light (oblique) is converted into the virtual image light Lb2 which is circularly polarized light. In this case, the quarter wave plate is selected in such a manner that the wave plate 22R disposed at the incident side position A of the right eye side and the wave plate 22L disposed at the incident side position A of the left eye side are opposite to each other in the rotation direction of the circularly polarized light.

In the case illustrated in (2-I) of FIG. 5, as the wave plate 51 disposed at the emission side position B, a quarter wave plate is selected. With this quarter wave plate, the circularly polarized virtual image light Lb3 transmitted through the folding mirror 30 is converted into the linearly polarized virtual image light Lb4. In this case, at the emission side position B, a quarter wave plate with the same optical rotation is selected for each of the wave plate 51R disposed on the right eye side and the wave plate 51L disposed on the left eye side. In this case, the right-eye virtual image light Lb3R and the left-eye virtual image light Lb3L are converted by the wave plates 51R and 51L into the right eye virtual image light Lb4R and the left eye virtual image light Lb4L that are linearly polarized light beams (oblique) with the polarization directions shifted from each other by 90 degrees.

As the polarization plate 52 disposed at the emission side position B, a polarization plate through which the virtual image light Lb4 of the linearly polarized light (oblique) as a result of the conversion by the wave plate 51 can pass is selected. In this case, the polarization direction of light passing through the polarization plate 52R disposed at the emission side position B on the right eye side and the polarization direction of light passing through the polarization plate 52L disposed at the emission side position B on the left eye side are shifted from each other by 90 degrees.

Therefore, for example, when the right-eye virtual image light Lb3R transmitted through the folding mirror 30 reaches the emission side position B on the left eye side, it is converted into linearly polarized right-eye virtual image light Lb4R by the wave plate 51L. However, the right-eye virtual image light Lb4R is polarized light polarized in a direction shifted by 90 degrees with respect to the polarization direction of the polarization plate 52L, and thus is blocked by the polarization plate 52L. Similarly, when the left-eye virtual image light Lb3L transmitted through the folding mirror 30 reaches the emission side position B on the right eye side, it is converted into linearly polarized left-eye virtual image light Lb4L by the wave plate 51R. However, the left-eye virtual image light Lb4L is polarized light polarized in a direction shifted by 90 degrees with respect to the polarization direction of the polarization plate 52R, and thus is blocked by the polarization plate 52R.

Furthermore, the real image light La1 which is linearly polarized light (vertical) or linearly polarized light (horizontal) passes through the combiner mirror 40 and the folding mirror 30 to become real image light La2 while still being linearly polarized light. The real image light La2 is incident on the left and right wave plates 51R and 51L respectively, and is converted into the circularly polarized real image light La3 by the left and right wave plates 51R and 51L to be incident on the polarization plates 52R and 52L respectively. In this case, in the left and right real image light La3, the components with the same polarization directions as the polarization directions of the polarization plates 52R and 52L pass through the polarization plates 52R and 52L to be the real image light La4. When the real image light La3 is circularly polarized light not including elliptically polarized light, the amount of the component of the real image light La3 passing through the polarization plate 52R is the same as the amount of the component of the real image light La3 passing through the polarization plate 52L. Therefore, the right-eye real image light La4R and the left-eye real image light La4L have the same brightness, and the real image light La can be uniformly viewed by the left eye EL and the right eye ER.

(3) Case Where the Real Image Light La Includes Linearly Polarized Light (Vertical) or Linearly Polarized Light (Horizontal) and the Virtual Image Light Lb Includes Circularly Polarized Light In this case, the polarization plate 21 is not disposed at the incident side position A. Further, as the wave plate 22 disposed at the incident side position A, for example, the wave plate 22 may not be provided or a quarter wave plate may be selected.

As illustrated in (3-I) of FIG. 5, when a quarter wave plate is disposed at the incident side position A, the virtual image light Lb1 which is circularly polarized light is converted into the virtual image light Lb2 which is linearly polarized light. In this case, a quarter wave plate is selected as the wave plate 22R disposed at the incident side position A on the right eye side and the wave plate 22L disposed at the incident side position A on the left eye side, so that the virtual image light Lb1 which is circularly polarized light is converted into virtual image light Lb2 which is linearly polarized light (vertical) or linearly polarized light (horizontal).

In the case illustrated in (3-I) of FIG. 5, as the wave plate 51 disposed at the emission side position B, a half wave plate is selected. In this case, at the emission side position B, a half wave plate is selected as the wave plate 51R disposed on the right eye side and the wave plate 51L disposed on the left eye side, so that the virtual image light Lb3 is converted into virtual image light Lb4 with the linearly polarized light beam (oblique), the polarization direction thereof on the right eye side and the polarization direction thereof on the left eye side being shifted from each other by 90 degrees. With this half wave plate, the virtual image light Lb3 which is linearly polarized light (vertical) or linearly polarized light (horizontal) transmitted through the folding mirror 30 is converted into the virtual image light Lb4 which is linearly polarized light beam (oblique) in the left eye side and the right eye side respectively, the polarization directions thereof being shifted from each other by 90 degrees.

As the polarization plate 52 disposed at the emission side position B, a polarization plate through which the virtual image light Lb4 of the linearly polarized light (oblique) as a result of the conversion by the wave plate 51 can pass is selected. In this case, the polarization direction of light passing through the polarization plate 52R disposed at the emission side position B on the right eye side and the polarization direction of light passing through the polarization plate 52L disposed at the emission side position B on the left eye side are shifted from each other by 90 degrees.

Therefore, for example, when the right-eye virtual image light Lb3R transmitted through the folding mirror 30 reaches the emission side position B on the left eye side, it is converted into linearly polarized right-eye virtual image light Lb4R by the wave plate 51L. However, the right-eye virtual image light Lb4R is polarized light polarized in a direction shifted by 90 degrees with respect to the polarization direction of the polarization plate 52L, and thus is blocked by the polarization plate 52L. Similarly, when the left-eye virtual image light Lb3L transmitted through the folding mirror 30 reaches the emission side position B on the right eye side, it is converted into linearly polarized left-eye virtual image light Lb4L by the wave plate 51R. However, the left-eye virtual image light Lb4L is polarized light polarized in a direction shifted by 90 degrees with respect to the polarization direction of the polarization plate 52R, and thus is blocked by the polarization plate 52R.

Furthermore, the real image light La1 which is linearly polarized light (vertical) or linearly polarized light (horizontal) passes through the combiner mirror 40 and the folding mirror 30 to become real image light La2 while still being linearly polarized light. The real image light La2 is incident on the left and right wave plates 51R and 51L respectively, and is converted into the real image light La3 which is linearly polarized light (oblique) by the left and right wave plates 51R and 51L to be incident on the polarization plates 52R and 52L respectively. In this case, in the left and right real image light La3, the components with the same polarization directions as the polarization directions of the polarization plates 52R and 52L pass through the polarization plates 52R and 52L to be the real image light La4. Here, an amount of the component of the real image light La3 passing through the polarization plate 52R is the same as an amount of the component of the real image light La3 passing through the polarization plate 52L. Therefore, the right-eye real image light La4R and the left-eye real image light La4L have the same brightness, and the real image light La can be uniformly viewed by the left eye EL and the right eye ER.

On the other hand, as illustrated in (3-II) in FIG. 5, when the wave plate 22 is not disposed at the incident side position A, the circularly polarized light of the virtual image light Lb1 reaches the emission side position B without being converted. Thus, as the wave plate 51 disposed at the emission side position B, a quarter wave plate is selected. In this case, at the emission side position B, the quarter wave plate is selected in such a manner that the wave plate 51R disposed on the right eye side and the wave plate 51L disposed on the left eye side have optical axis directions shifted from each other by 90 degrees.

As the polarization plate 52 disposed at the emission side position B, a polarization plate through which the virtual image light Lb4 which is the linearly polarized light (linearly polarized light (vertical), linearly polarized light (horizontal), or linearly polarized light (oblique)) as a result of the conversion by the wave plate 51 can pass is selected. In this case, the polarization direction of the polarization plate 52R disposed at the emission side position B on the right eye side differs by 90 degrees from the polarization direction of the polarization plate 52L disposed at the emission side position B on the left eye side.

Therefore, for example, when the right-eye virtual image light Lb3R which is circularly polarized light transmitted through the folding mirror 30 reaches the emission side position B on the left eye side, it is converted into linearly polarized right-eye virtual image light Lb4R by the wave plate 51L. However, the right-eye virtual image light Lb4R is polarized light polarized in a direction shifted with respect to the polarization direction of the polarization plate 52L, and thus is blocked by the polarization plate 52L. Similarly, when the left-eye virtual image light Lb3L which is circularly polarized light transmitted through the folding mirror 30 reaches the emission side position B on the right eye side, it is converted into linearly polarized left-eye virtual image light Lb4L by the wave plate 51R. However, the left-eye virtual image light Lb4L is polarized light polarized in a direction shifted with respect to the polarization direction of the polarization plate 52R, and thus is blocked by the polarization plate 52R.

Furthermore, the real image light La1 which is linearly polarized light (vertical) or linearly polarized light (horizontal) passes through the combiner mirror 40 and the folding mirror 30 to become real image light La2 while still being linearly polarized light. The real image light La2 is incident on the left and right wave plates 51R and 51L respectively, and is converted into the circularly polarized real image light La3 by the left and right wave plates 51R and 51L to be incident on the polarization plates 52R and 52L respectively. In this case, in the left and right real image light La3, the components with the same polarization directions as the polarization directions of the polarization plates 52R and 52L pass through the polarization plates 52R and 52L to be the real image light La4. Here, an amount of the component of the real image light La3 passing through the polarization plate 52R is the same as an amount of the component of the real image light La3 passing through the polarization plate 52L. Therefore, the right-eye real image light La4R and the left-eye real image light La4L have the same brightness, and the real image light La can be uniformly viewed by the left eye EL and the right eye ER.

Thus, the right-eye virtual image light LbR emitted from the right-eye optical system OSR is blocked by the polarization plate 52L on the emission side of the left-eye optical system OSL. Furthermore, the left-eye virtual image light LbL emitted from the left-eye optical system OSL is blocked by the polarization plate 52R on the emission side of the right-eye optical system OSR. Then, in the real image light La emitted from the right-eye optical system OSR and the left-eye optical system OSL, the component with the same amount passes through the polarization plates 52R and 52L respectively.

(4) Case Where the Real Image Light La Includes Linearly Polarized Light (Oblique)

In this case, the virtual image light Lb1 is set to be linearly polarized light (vertical) or linearly polarized light (horizontal) (the same direction in the right eye side and the left eye side). The polarization plate 21 disposed at the incident side position A can be a polarization plate having a polarization direction in a direction in which the virtual image light Lb1 can be transmitted. Also in this case, the polarization plate 21 may not be provided. In this case, the optical loss in the polarization plate 21 needs not to be taken into consideration since the polarization plate 21 is not provided, and thus light can be efficiently used. Furthermore, as the wave plate 22 disposed at the incident side position A, for example, a half wave plate may be selected.

When a half wave plate is selected as the wave plate 22 at the incident side position A illustrated in (4-I) of FIG. 5, the half wave plate is provided as both of the left and right wave plates 22, or is provided as only one of the left and right wave plates 22. For example, the half wave plate is selected only as the wave plate 22L, and nothing is disposed on the wave plate 22R.

Figure 8A:
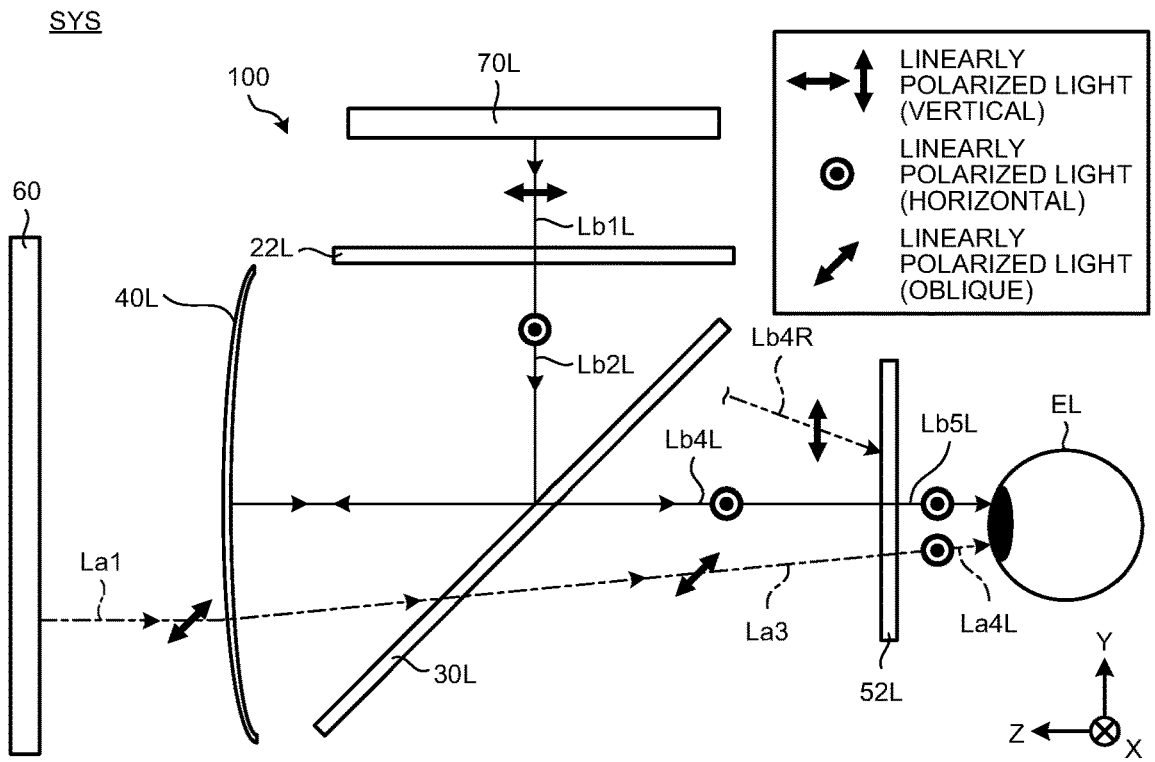
FIG. 8A is a left-eye side view illustrating an example of a combination in the table of FIG. 5.
Figure 8B:
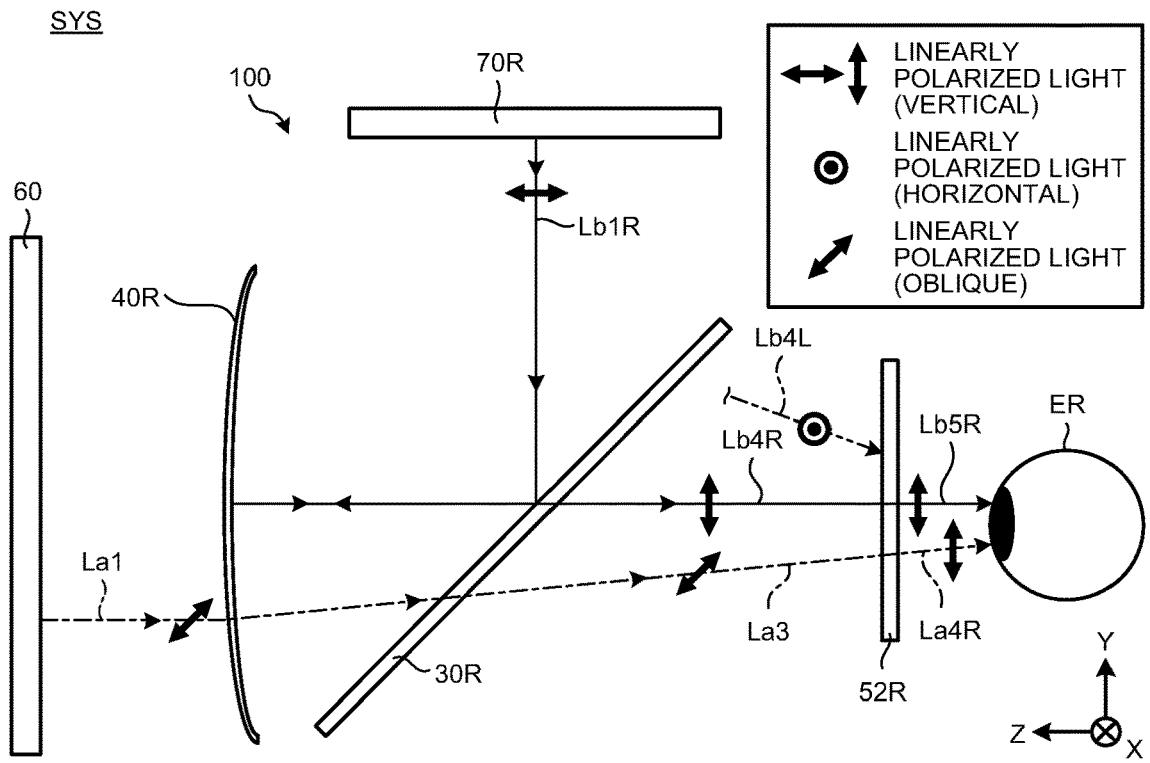
FIG. 8B is a right-eye side view illustrating an example of a combination in the table of FIG. 5.

FIGS. 8A and 8B schematically illustrate an example (example 4-I) of a combination in the table illustrated in FIG. 5. FIG. 8A illustrates the left eye side, and FIG. 8B illustrates the right eye side. In this case, the left-eye virtual image light Lb1L is converted by the wave plate 22L disposed at the incident side position A on the left eye side to become a left-eye virtual image light Lb2L having the polarization direction shifted from that of the right-eye virtual image light Lb1R by 90 degrees. For example, the wave plate 22L is a half wave plate having an optical axis. The optical axis of the wave plate 22L is disposed while being inclined by a predetermined angle with respect to the Z axis that is the same as the polarization direction of the left-eye virtual image light Lb1L. The predetermined angle by which the optical axis of the wave plate 22L is inclined is 45 degrees in the clockwise direction as viewed in the traveling direction (−Y direction) of the virtual image light Lb1. With this configuration, as illustrated in FIG. 8A, when the left-eye virtual image light Lb1L, which is linearly polarized light (vertical), passes through the wave plate 22L, it becomes, for example, left eye virtual image light Lb2L which is linearly polarized light (horizontal). As illustrated in FIG. 8B, the right eye virtual image light Lb1R which is linearly polarized light (vertical) reaches the emission side position B as the right-eye virtual image light Lb4R which is linearly polarized light (vertical) without being converted.

In the case illustrated in (4-I) of FIG. 5, the wave plate 51 is not disposed at the emission side position B. As illustrated in FIG. 8A, the wave plate 51L is not disposed, and as illustrated in FIG. 8B, the wave plate 51R is not disposed. As the polarization plate 52 disposed at the emission side position B, a linear polarization (vertical) plate or a linear polarization (horizontal) plate through which the virtual image light Lb4 which is the linearly polarized light (vertical) or the linearly polarized light (horizontal) can pass is selected. In this case, the polarization direction of light passing through the polarization plate 52R disposed at the emission side position B on the right eye side and he polarization direction of light passing through the polarization plate 52L disposed at the emission side position B on the left eye side are shifted from each other by 90 degrees. For example, as illustrated in FIG. 8A, the left-eye polarization plate 52L is arranged to enable the linearly polarized light (horizontal) to pass therethrough. As illustrated in FIG. 8B, the right-eye polarization plate 52R is arranged to enable the linearly polarized light (vertical) to pass therethrough.

Therefore, for example, when the right-eye virtual image light Lb4R transmitted through the folding mirror 30 reaches the emission side position B on the left eye side, it is blocked by the polarization plate 52L since the light is polarized light polarized in a direction shifted by 90 degrees from the polarization direction of the polarization plate 52L. Thus, as illustrated in FIG. 8A, the right-eye virtual image light Lb4R reaches the emission side position B as linearly polarized light (vertical), but is blocked by the polarization plate 52L through which linearly polarized light (horizontal) can pass. Similarly, when the left-eye virtual image light Lb4L transmitted through the folding mirror 30 reaches the emission side position B on the right eye side, it is blocked by the polarization plate 52R since the light is polarized light polarized in a direction shifted by 90 degrees from the polarization direction of the polarization plate 52R. Thus, as illustrated in FIG. 8B, the left-eye virtual image light Lb4L reaches the emission side position B as linearly polarized light (horizontal), but is blocked by the polarization plate 52R through which linearly polarized light (vertical) can pass.

Furthermore, the real image light La1 which is linearly polarized light (oblique) is transmitted through the combiner mirror 40 and the folding mirror 30 to become real image light La3. Some components of each of the image light beams La3 pass through the polarization plates 52R and 52L, respectively, to become the real image light La4. Specifically, as illustrated in FIG. 8A, in the real image light La3 which is linearly polarized light (oblique), a linearly polarized light (horizontal) component transmits through the polarization plate 52L through which the linearly polarized light (horizontal) can pass, to become left-eye real image light La4L which is linearly polarized light (horizontal). Furthermore, as illustrated in FIG. 8B, in the real image light La3 which is linearly polarized light (oblique), a linearly polarized light (vertical) component transmits through the polarization plate 52R through which the linearly polarized light (vertical) can pass, to become right-eye real image light La4R which is linearly polarized light (vertical). Here, assuming that the polarization direction of the real image light La3 is inclined by 45 degrees in the clockwise or counterclockwise direction with respect to the linearly polarized light (vertical) as viewed in the traveling direction of light, an amount of the component of the linearly polarized light (horizontal) is the same as an amount of the component of the linearly polarized light (vertical) in the real image light La3. Therefore, the right-eye real image light La4R and the left-eye real image light La4L have the same brightness, and the real image light La can be uniformly viewed by the left eye EL and the right eye ER.

Thus, the right-eye virtual image light LbR emitted from the right-eye optical system OSR is blocked by the polarization plate 52L on the emission side of the left-eye optical system OSL. Furthermore, the left-eye virtual image light LbL emitted from the left-eye optical system OSL is blocked by the polarization plate 52R on the emission side of the right-eye optical system OSR. Then, in the real image light La emitted from the right-eye optical system OSR and the left-eye optical system OSL, the component with the same amount passes through the polarization plates 52R and 52L respectively.

(5) Case Where Real Image Light La Includes Circularly Polarized Light

In this case, the virtual image light Lb1 is set to be linearly polarized light (vertical) or linearly polarized light (horizontal) (the same direction in the right eye side and the left eye side). The polarization plate 21 disposed at the incident side position A can be a polarization plate having a polarization direction in a direction in which the virtual image light Lb1 can be transmitted. Also in this case, the polarization plate 21 may not be provided. In this case, the optical loss in the polarization plate 21 needs not to be taken into consideration since the polarization plate 21 is not provided, and thus light can be efficiently used. Furthermore, as the wave plate 22 disposed at the incident side position A, for example, a half wave plate may be selected.

When a half wave plate is selected for the incident side position A illustrated in (5-I) of FIG. 5, the half wave plate is provided as both of the left and right wave plates 22, or is provided as only one of the left and right sides. For example, the half wave plate is selected only as the wave plate 22L, and nothing is disposed on the wave plate 22R. In this case, the left-eye virtual image light Lb1L is converted by the wave plate 22L disposed at the incident side position A on the left eye side to become a left-eye virtual image light Lb2L having the polarization direction shifted from that of the right-eye virtual image light Lb1R by 90 degrees.

In the case illustrated in (5-I) of FIG. 5, the wave plate 51 is not disposed at the emission side position B. In this case, the polarization direction of light passing through the polarization plate 52R disposed at the emission side position B on the right eye side and the polarization direction of light passing through the polarization plate 52L disposed at the emission side position B on the left eye side are shifted from each other by 90 degrees.

Therefore, for example, when the right-eye virtual image light Lb4R transmitted through the folding mirror 30 reaches the emission side position B on the left eye side, it is blocked by the polarization plate 52L since the light is polarized light polarized in a direction shifted by 90 degrees from the polarization direction of the polarization plate 52L. Similarly, when the left-eye virtual image light Lb4L transmitted through the folding mirror 30 reaches the emission side position B on the right eye side, it is blocked by the polarization plate 52R since the light is polarized light polarized in a direction shifted by 90 degrees from the polarization direction of the polarization plate 52R.

Furthermore, the real image light La1 which is circularly polarized light is transmitted through the combiner mirror 40 and the folding mirror 30 to become real image light La3. The real image light La3 is incident on the polarization plate 52 while still being circularly polarized light. In this case, in the left and right real image light La3, the components with the same polarization directions as the polarization directions of the polarization plates 52R and 52L pass through the polarization plates 52R and 52L to be the real image light La4. When the real image light La3 is circularly polarized light not including elliptically polarized light, an amount of the component of the real image light La3 passing through the polarization plate 52R is the same as an amount of the component of the real image light La3 passing through the polarization plate 52L. Therefore, the right-eye real image light La4R and the left-eye real image light La4L have the same brightness, and the real image light La can be uniformly viewed by the left eye EL and the right eye ER.

Thus, the right-eye virtual image light LbR emitted from the right-eye optical system OSR is blocked by the polarization plate 52L on the emission side of the left-eye optical system OSL. Furthermore, the left-eye virtual image light LbL emitted from the left-eye optical system OSL is blocked by the polarization plate 52R on the emission side of the right-eye optical system OSR. Then, in the real image light La emitted from the right-eye optical system OSR and the left-eye optical system OSL, the component with the same amount passes through the polarization plates 52R and 52L respectively.

As described above, the head mounted display 100 according to the present embodiment includes an optical system OS comprising: a right-eye optical system OSR configured to guide a real image light La for forming a real visual field image and a right-eye virtual image light LbR for forming a right-eye virtual image that is superimposed on the real visual field image; and a left-eye optical system OSL configured to guide the real image light La and a left-eye virtual image light LbL for forming a left-eye virtual image that is superimposed on the real visual field image; and an optical element OE comprising: one first polarization plate 52R disposed in an optical axis AX of the right-eye optical system OSR at an emission side thereof as an emission side position B; and another first polarization plate 52L disposed in an optical axis AX of the left-eye optical system OSL at an emission side thereof as the emission side position B; wherein the right-eye virtual image light LbR emitted from the right-eye optical system OSR is blocked by the another first polarization plate 52L disposed at the emission side position B of the left-eye optical system OSL and the left-eye virtual image light LbL emitted from the left-eye optical system OSL is blocked by the first polarization plate 52R disposed at the emission side position B of the right-eye optical system OSR; and at least one of: one first wave plate 51R that can be disposed between the right-eye optical system OSR and the one first polarization plate 52R at the emission side position B of the right-eye optical system OSR so that the real image light La emitted from the right-eye optical system OSR passes through the one first polarization plate 52R disposed at the emission side position B of the right-eye optical system OSR; another first wave plate 51L that can be disposed between the left-eye optical system OSL and the another first polarization plate 52L at the emission side position B of the left-eye optical system OSL so that the real image light La emitted from the left-eye optical system OSL passes through the another first polarization plate 52L disposed at the emission side position B of the left-eye optical system OSL; one second wave plate 22R that can be disposed at an incident side position A located in an optical path of the right-eye virtual image light LbR travelling toward the right-eye optical system OSR; and another second wave plate 22L that can be disposed at the incident side position A located in an optical path of the left-eye virtual image light LbL travelling toward the left-eye optical system OSL.

A head mounted display system SYS according to the present embodiment includes: a real image display 60 configured to emit real image light La for forming a real visual field image; a virtual image display 70 comprising: one virtual image display 70R configured to emit a right-eye virtual image light LbR for forming a right-eye virtual image that is superimposed on the real visual field image; and another virtual image display 70L configured to emit a left-eye virtual image light LbL for forming a left-eye virtual image that is superimposed on the real visual field image; an optical system OS comprising: a right-eye optical system OSR configured to guide a real image light La for forming a real visual field image and a right-eye virtual image light LbR for forming a right-eye virtual image that is superimposed on the real visual field image; and a left-eye optical system OSL configured to guide the real image light La and a left-eye virtual image light LbL for forming a left-eye virtual image that is superimposed on the real visual field image; and an optical element OE comprising: one first polarization plate 52R disposed in an optical axis AX of the right-eye optical system OSR at an emission side thereof as an emission side position B; and another first polarization plate 52L disposed in an optical axis AX of the left-eye optical system OSL at an emission side thereof as the emission side position B; wherein the right-eye virtual image light LbR emitted from the right-eye optical system OSR is blocked by the another first polarization plate 52L disposed at the emission side position B of the left-eye optical system OSL and the left-eye virtual image light LbL emitted from the left-eye optical system OSL is blocked by the first polarization plate 52R disposed at the emission side position B of the right-eye optical system OSR; and at least one of: one first wave plate 51R that can be disposed between the right-eye optical system OSR and the one first polarization plate 52R at the emission side position B of the right-eye optical system OSR so that the real image light La emitted from the right-eye optical system OSR passes through the one first polarization plate 52R disposed at the emission side position B of the right-eye optical system OSR; another first wave plate 51L that can be disposed between the left-eye optical system OSL and the another first polarization plate 52L at the emission side position B of the left-eye optical system OSL so that the real image light La emitted from the left-eye optical system OSL passes through the another first polarization plate 52L disposed at the emission side position B of the left-eye optical system OSL; one second wave plate 22R that can be disposed at an incident side position A located in an optical path of the right-eye virtual image light LbR travelling toward the right-eye optical system OSR; and another second wave plate 22L that can be disposed at the incident position A located in an optical path of the left-eye virtual image light LbL travelling toward the left-eye optical system OSL.

A setting method for a head mounted display 100 according to the present embodiment including an optical system OS comprising: a right-eye optical system OSR configured to guide a real image light La for forming a real visual field image and a right-eye virtual image light LbR for forming a right-eye virtual image that is superimposed on the real visual field image; and a left-eye optical system OSL configured to guide the real image light La and a left-eye virtual image light LbL for forming a left-eye virtual image that is superimposed on the real visual field image; the method comprising: setting an optical element OE comprising: one first polarization plate 52R disposed in an optical axis AX of the right-eye optical system OSR at an emission side thereof as an emission side position B; and another first polarization plate 52L disposed in an optical axis AX of the left-eye optical system OSL at an emission side thereof as the emission side position B; wherein the right-eye virtual image light LbR emitted from the right-eye optical system OSR is blocked by the another first polarization plate 52L disposed at the emission side position B of the left-eye optical system OSL and the left-eye virtual image light LbL emitted from the left-eye optical system OSL is blocked by the first polarization plate 52R disposed at the emission side position B of the right-eye optical system OSR; and at least one of: one first wave plate 51R that can be disposed between the right-eye optical system OSR and the one first polarization plate 52R at the emission side position B of the right-eye optical system OSR so that the real image light La emitted from the right-eye optical system OSR passes through the one first polarization plate 52R disposed at the emission side position B of the right-eye optical system OSR; another first wave plate 51L that can be disposed between the left-eye optical system OSL and the another first polarization plate 52L at the emission side position B of the left-eye optical system OSL so that the real image light La emitted from the left-eye optical system OSL passes through the another first polarization plate 52L disposed at the emission side position B of the left-eye optical system OSL; one second wave plate 22R that can be disposed at an incident side position A located in an optical path of the right-eye virtual image light LbR travelling toward the right-eye optical system OSR; and another second wave plate 22L that can be disposed at the incident side position A located in an optical path of the left-eye virtual image light LbL travelling toward the left-eye optical system OSL.

According to the present embodiment, by disposing the optical element OE, the right-eye virtual image light LbR emitted from the right-eye optical system OSR is blocked by the polarization plate 52 on the emission side of the left-eye optical system OSL, the left-eye virtual image light LbL emitted from the left-eye optical system OSL is blocked by the polarization plate 52 on the emission side of the right-eye optical system OSR, and the real image light La emitted from the right-eye optical system OSR and the left-eye optical system OSL passes through the respective polarization plates 52. As a result, even in a case where the real image light La contains polarized light, it is possible to suppress the real image light La from being blocked. Therefore, crosstalk can be reduced while suppressing influence on the real visual field.

In the head mounted display 100 according to the present embodiment, the right-eye virtual image light LbR and the left-eye virtual image light LbL include the same type of polarized light beams, and the optical element OE includes a polarization plate 21 through which the polarization light beam included in the right-eye virtual image light LbR and the left-eye virtual image light LbL respectively is transmittable, the polarization plate 21 being disposed on a side opposite to the right-eye optical system OSR and the left-eye optical system OSL relative to the wave plate 22. With this configuration, since the virtual image light Lb is more reliably polarized by the polarization plate 21, the crosstalk can be further reduced.

In the head mounted display 100 according to the present embodiment, in the optical element OE, an amount of a component of the real image light La emitted from the left-eye optical system OSL, the component being blocked by the polarization plate 52 of the left-eye optical system OSL, and an amount of a component of the real image light La emitted from the right-eye optical system OSR, the component being blocked by the polarization plate 52 of the right-eye optical system OSR, are the same amount. As a result, the real image light La can be uniformly viewed by the left eye EL and the right eye ER, and the influence on the real visual field can be further suppressed.

The head mounted display 100 according to the present embodiment further includes the incident side attachment/detachment portion 20 and the emission side attachment/detachment portion 50 to and from which the optical element OE is attachable/detachable, the attachment/detachment portions being provided at least one of the emission side position B and the incident side position A. With this configuration, the optical element OE can be replaced as appropriate according to the type of polarized light included in the real image light La and the virtual image light Lb, so that the head mounted display 100 usable for a wide range of applications can be provided.

The head mounted display 100 according to the present embodiment further includes the virtual image display 70 that emits the right-eye virtual image light LbR and the left-eye virtual image light LbL. With this configuration, the type of polarized light of the virtual image light Lb can be fixed.

In the head mounted display 100 according to the present embodiment, the optical element OE is provided to have an adjustable rotational position around the optical axis AX of the right-eye optical system OSR and the left-eye optical system OSL. With this configuration, the rotational position of the optical element OE can be adjusted according to the type of the polarized light included in the real image light La and the virtual image light Lb. Therefore, for example, the polarization direction can be changed by adjusting the rotational position of the polarization plate 21 around the optical axis AX.

According to an aspect of the present application, it is possible to reduce the crosstalk while suppressing the influence on the real visual field.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head mounted display system comprising:
  a real image display that is disposed in front of and separately from the head mounted display system and configured to emit real image light for forming a real visual field image;
  a virtual image display comprising:
    a virtual image display configured to emit a right-eye virtual image light for forming a right-eye virtual image that is superimposed on the real visual field image; and
    another virtual image display configured to emit a left-eye virtual image light for forming a left-eye virtual image that is superimposed on the real visual field image;
  an optical system comprising:
    a right-eye optical system configured to guide real image light for forming a real visual field image and right-eye virtual image light for forming a right-eye virtual image that is superimposed on the real visual field image; and
    a left-eye optical system configured to guide the real image light and left-eye virtual image light for forming a left-eye virtual image that is superimposed on the real visual field image;
  and
  an optical element comprising:
    a first polarization plate disposed in an optical axis of the right-eye optical system at an emission side thereof as an emission side position; and
    another first polarization plate disposed in an optical axis of the left-eye optical system at an emission side thereof as the emission side position;
    wherein the right-eye virtual image light emitted from the right-eye optical system is blocked by the another first polarization plate disposed at the emission side position of the left-eye optical system and the left-eye virtual image light emitted from the left-eye optical system is blocked by the first polarization plate disposed at the emission side position of the right-eye optical system;
    and at least one of:
    a first wave plate that is disposed between the right-eye optical system and the first polarization plate at the emission side position of the right-eye optical system so that the real image light emitted from the right-eye optical system passes through the first polarization plate disposed at the emission side position of the right-eye optical system;
    another first wave plate that is disposed between the left-eye optical system and the another first polarization plate at the emission side position of the left-eye optical system so that the real image light emitted from the left-eye optical system passes through the another first polarization plate disposed at the emission side position of the left-eye optical system;
  a second wave plate that is disposed at an incident side position located in an optical path of the right-eye virtual image light travelling toward the right-eye optical system; and
  another second wave plate that is disposed at the incident side position located in an optical path of the left-eye virtual image light travelling toward the left-eye optical system,
  wherein
  the virtual image display is disposed above the right-eye optical system, and
  the right-eye optical system comprises:
    a folding mirror that reflects the right-eye virtual image light emitted from the virtual image display toward a direction opposite to a direction to the first polarization plate, and
    a combiner mirror on which the right-eye virtual image light reflected by the folding mirror is projected and through which the real image light incident from a direction opposite to a direction to the folding mirror is transmitted, wherein
    the real image light transmitted through the combiner mirror is transmitted through the folding mirror, and
  the virtual image display is disposed above the left-eye optical system, and
  the left-eye optical system comprises:
    another folding mirror that reflects the left-eye virtual image light emitted from the another virtual image display toward a direction opposite to a direction to the another first polarization plate, and
    another combiner mirror on which the left-eye virtual image light reflected by the another folding mirror is projected and through which the real image light incident from a direction opposite to a direction to the another folding mirror is transmitted, wherein
    the real image light transmitted through the another combiner mirror is transmitted through the another folding mirror, wherein
  the real image light emitted by the real image display includes linearly polarized light,
  each of the right-eye virtual image light and the left-eye virtual image light emitted by the virtual image display includes linearly polarized light,
  each of the first wave plate and the another first wave plate is a quarter wave plate, and
  each of the second wave plate and the another second wave plate is a quarter wave plate.

2. The head mounted display system according to claim 1, wherein
  the right-eye virtual image light and the left-eye virtual image light include a same type of a polarized light beam, and
  the optical element includes a second polarization plate disposed on a side opposite to the right-eye optical system relative to the second wave plate through which the polarized light beam included in the right-eye virtual image light transmits and another second polarization plate disposed on a side opposite to the left-eye optical system relative to the another second wave plate through which the polarized light beam included in the left-eye virtual image light transmits.

3. The head mounted display system according to claim 1, wherein in the optical element, an amount of a first component of the real image light emitted from the left-eye optical system, the first component being blocked by the another first polarization plate of the left-eye optical system, corresponds to an amount of a second component of the real image light emitted from the right-eye optical system, the second component being blocked by the first polarization plate of the right-eye optical system.

4. The head mounted display system according to claim 1, further comprising an attachment/detachment portion to and from which the optical element is attachable and detachable, the attachment/detachment portion being provided at least one of at the emission side position or at the incident side position.

5. The head mounted display system according to claim 1, further comprising a virtual image display configured to emit the right-eye virtual image light and another virtual image display configured to emit the left-eye virtual image light.

6. The head mounted display system according to claim 1, wherein, in the optical element, a rotational position of the right-eye optical system around the optical axis thereof and a rotational position of the left-eye optical system around the optical axis thereof are adjustable.

\* \* \* \* \*